US010002033B2

United States Patent
Srivastava et al.

(10) Patent No.: US 10,002,033 B2
(45) Date of Patent: Jun. 19, 2018

(54) EFFICIENTLY RECEIVING MESSAGES ACROSS A LARGE NUMBER OF MESSAGING ENTITIES

(75) Inventors: Manu Srivastava, Redmond, WA (US); Kartik Paramasivam, Redmond, WA (US); Murali Krishnaprasad, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 643 days.

(21) Appl. No.: 13/368,107

(22) Filed: Feb. 7, 2012

(65) Prior Publication Data

US 2013/0204934 A1    Aug. 8, 2013

(51) Int. Cl.
G06F 15/16    (2006.01)
G06F 9/54    (2006.01)

(52) U.S. Cl.
CPC ........ G06F 9/542 (2013.01); *G06F 2209/544* (2013.01)

(58) Field of Classification Search
CPC ................................ G06F 9/546; G06F 9/542
USPC ........................................................ 709/204
See application file for complete search history.

(56) References Cited

U.S. PATENT DOCUMENTS

| 5,548,760 | A | 8/1996 | Healey |
| 6,058,389 | A | 5/2000 | Chandra et al. |
| 6,629,217 | B1* | 9/2003 | Clohset et al. ............... 711/154 |
| 6,868,529 | B1* | 3/2005 | Frannhagen .................. 709/225 |
| 7,177,917 | B2 | 2/2007 | Giotta |
| 7,231,425 | B1* | 6/2007 | Charny et al. ................ 709/205 |
| 7,590,691 | B2* | 9/2009 | Gonsalves et al. ........... 709/205 |
| 7,720,973 | B2 | 5/2010 | Patiejunas |
| 7,941,448 | B2 | 5/2011 | Eslambolchi et al. |
| 2003/0120720 | A1 | 6/2003 | Montero |
| 2003/0182464 | A1* | 9/2003 | Hamilton et al. ............ 709/314 |
| 2004/0024774 | A1* | 2/2004 | Jain et al. ..................... 707/102 |
| 2006/0116075 | A1* | 6/2006 | Gallo ............................ 455/41.2 |
| 2006/0171407 | A1* | 8/2006 | Kim et al. ..................... 370/432 |
| 2006/0277317 | A1 | 12/2006 | Clark et al. |

(Continued)

FOREIGN PATENT DOCUMENTS

EP    1347390 A1    9/2003

OTHER PUBLICATIONS

Droms (RFC 2131—DHCP, 1997).*

(Continued)

*Primary Examiner* — Vivek Srivastava
*Assistant Examiner* — Nicholas Celani
(74) *Attorney, Agent, or Firm* — Fiala & Weaver P.L.L.C.

(57) ABSTRACT

A messaging service is described that facilitates the efficient receipt of messages by a client from across a large number of messaging entities hosted by different messaging hosts within a distributed messaging system. A gateway in the distributed messaging system forwards a request for an available message or set of related messages from the client to each of the messaging hosts. Each messaging host provides a response to a request if a messaging entity hosted thereby includes at least one available message or set of related messages. The messaging host manages the order in which responses from different messaging entities are provided to ensure fairness. The gateway forwards a selected one of the responses to the consumer, while caching the other responses to service future requests from the consumer.

20 Claims, 9 Drawing Sheets

(56) References Cited

U.S. PATENT DOCUMENTS

| | | | |
|---|---|---|---|
| 2007/0067389 A1 | 3/2007 | Bedi et al. | |
| 2009/0119366 A1* | 5/2009 | Cernohous et al. | 709/203 |
| 2009/0133039 A1 | 5/2009 | Chkodrov et al. | |
| 2010/0100890 A1* | 4/2010 | Dar et al. | 719/314 |
| 2010/0318654 A1* | 12/2010 | Paramasivam et al. | 709/225 |
| 2011/0099233 A1 | 4/2011 | Calder et al. | |

OTHER PUBLICATIONS

Kazemzadeh, et al. "Reliable and Highly Available Distributed Publish/Subscribe Service", Retrieved at <<http://ieeexplore.ieee.org/stamp/stamp.jsp?tp=&arnumber=5283489>>, 28th IEEE International Symposium on Reliable Distributed Systems, Sep. 27-30, 2009, pp. 41-50.

"International Search Report", dated May 8, 2013, Application No. PCT/US2013/024555, Filed date: Feb. 4, 2013, pp. 9.

Supplementary European Search Report Issued in Patent Application No. 13747185.0, dated Dec. 4, 2015, 9 Pages.

"Office Action Issued in European Patent Application No. 13747185.0", dated Dec. 22, 2017, 3 Pages.

* cited by examiner

EFFICIENTLY RECEIVING MESSAGES ACROSS A LARGE NUMBER OF MESSAGING ENTITIES

BACKGROUND

A messaging service may be implemented via a publicly-hosted distributed messaging system that provides support for a variety of messaging patterns. These messaging patterns may include, but are not limited to, a queue-based messaging pattern or a topic-based messaging pattern. In accordance with a queue-based messaging pattern, clients referred to as publishers can enqueue/publish messages, which are stored in the messaging system. Eventually, clients referred to as consumers can dequeue the messages. Every single published message goes to only one consumer. In accordance with a topic-based messaging pattern, several publishers can enqueue/publish messages, which are stored in the messaging system. Multiple subscribers may have a registered interest, referred to as a "subscription," for receiving messages that are published to the topic. Subscribers may also optionally register rules/filters to determine if they are interested in a message. Every message that is published to the topic is delivered to all the matching subscriptions.

In certain messaging service implementations, if a user wishes to receive a message from a particular queue or subscription, then the following steps must be performed: (1) a connection is established to the messaging service; (2) a receive request is lodged for the particular queue or subscription; and (3) when the particular queue or subscription receives a message, a response is sent for that particular queue or subscription. In accordance with such an implementation, if a user wishes to listen for messages across a small number of queues/subscriptions (e.g., in the order of 100s), then the above steps can be performed for each queue without significantly impairing system performance. However, if a user wishes to listen for messages across a large number of queues/subscriptions (e.g., millions of them), then the above approach simply does not scale. For example, in certain implementations, sending one million receive requests alone could take on the order of hours, which would likely be considered unacceptable. Furthermore, if the queues or subscriptions are sparsely populated with data, then a large amount of network traffic is generated by the user for retrieving a comparatively negligible amount of data.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
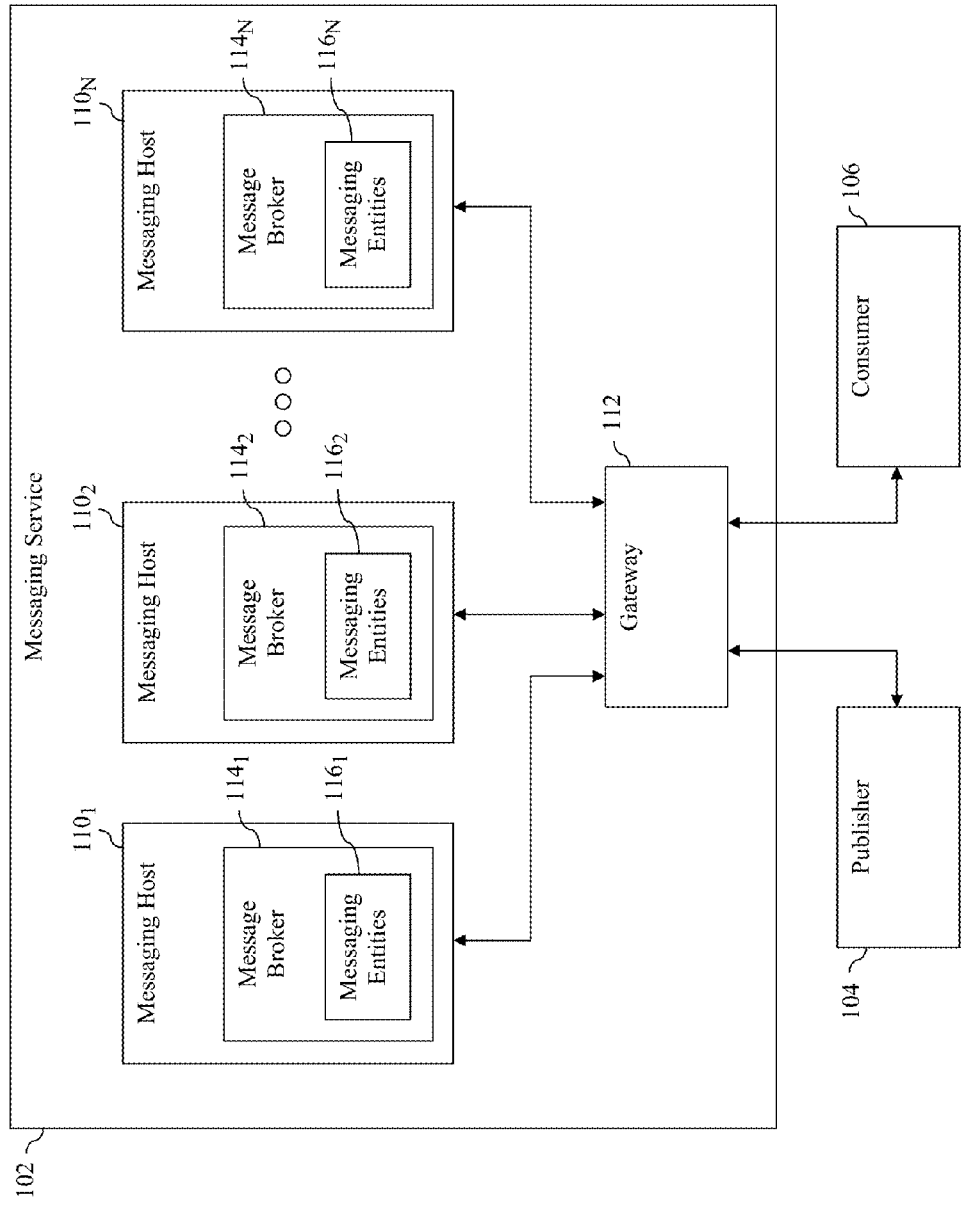
FIG. 1 is a block diagram of an example distributed messaging system in which embodiments may be implemented.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

II. Example Operating Environment

FIG. 1 is a block diagram of an example distributed messaging system 100 in which embodiments of the invention may be implemented. Distributed, messaging system 100 is described herein by way of illustration only and is not intended to be limiting. Persons skilled in the relevant art(s) will appreciate that embodiments described herein may be implemented in systems other than distributed messaging system 100.

Distributed messaging system 100 comprises a messaging service 102 that operates at least in part to receive messages from clients, store such messages, and then subsequently deliver the stored messages to other clients. As used herein, the term "client" broadly refers to any machine or process that is capable of sending messages to or receiving messages from a messaging service, such as messaging service 102. As further used herein, the term "publisher" refers to a client that sends messages to a messaging service, while the term "consumer" refers to a client that receives messages from a messaging service. For the purposes of illustration, FIG. 1 includes a single publisher 104 and a single consumer 106 each of which is capable of connecting to and interacting with messaging service 102. However, it is to be understood that distributed messaging system 100 may include any number of publishers and consumers, and may also include multiple instances of a single publisher or consumer. Furthermore, depending upon the implementation, it is possible that a single client can act both as a publisher and consumer.

Messaging service 102 includes a collection of messaging hosts $110_1$-$110_n$. Each messaging host comprises a machine or process that hosts at least one message broker $114_1$. Thus, as shown in FIG. 1, messaging host $110_1$ hosts message broker $114_1$, messaging host $110_2$ hosts message broker $114_2$, and messaging host $110_N$ hosts message broker $114_N$. Although FIG. 1 shows that each of messaging hosts $110_1$-$110_N$ hosts a single message broker, it is to be understood that a single messaging host may host any number of message brokers depending upon the implementation. Each message broker comprises a software-implemented service that provides for the receipt, storage, and subsequent delivery of messages in accordance with a variety of messaging patterns. These messaging patterns may include, but are not limited to, a queue-based messaging pattern or a topic-based messaging pattern.

Figure 2:
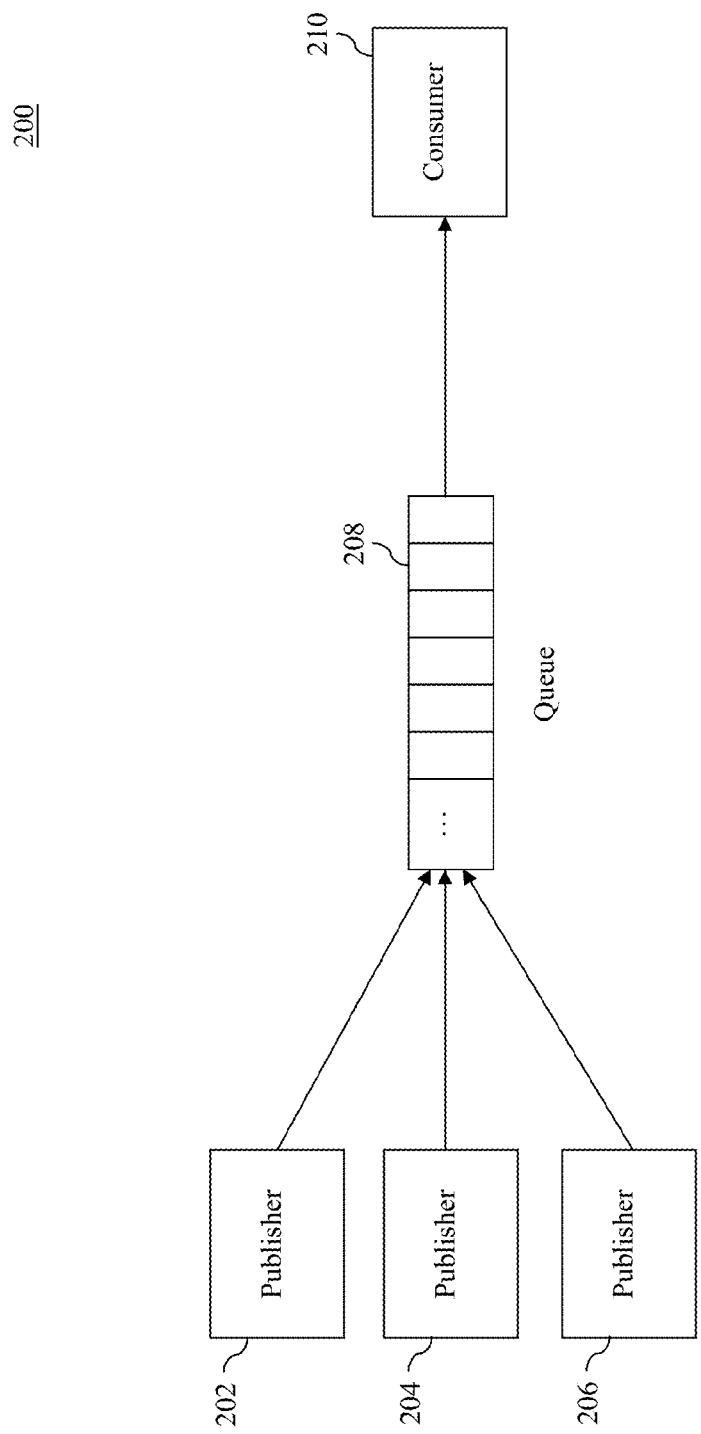
FIG. 2 is a block diagram that illustrates a queue-based messaging pattern that may be supported by a distributed, messaging system.

A queue-based messaging pattern will now be described, in reference to block diagram 200 of FIG. 2. In accordance with this pattern, each of a plurality of publishers 202, 204 and 206 is capable of publishing messages which are enqueued in a queue 208. Queue 208 is managed by a message broker (such as any of message brokers $114_1$-$114_N$ as shown in FIG. 1) and the messages that are contained therein are stored in a storage system or device that is accessible to the message broker. Each of the messages contained in queue 208 may be subsequently dequeued by a consumer, such as consumer 210, in which case they are removed from storage in distributed messaging system 102 and transmitted to the consumer. In one implementation, every published message contained in queue 208 is intended to be received by a single consumer only.

For example, in a retail-related scenario, each publisher 202, 204 and 206 may comprise a Point of Sale (POS) terminal that produces sales data and consumer 210 may comprise an inventory management system that uses such sales data to determine when stock needs to replenished. Each publisher 202, 204 and 208 reports its sales data by sending messages to queue 208. These messages reside in queue 208 until they are requested by consumer 210. This pattern may be referred to as asynchronous messaging because publishers 202, 204 and 206 do not need to wait for a reply from consumer 210 to continue processing.

The queue-based messaging pattern described above may provide several advantages as compared to having publishers interact directly (synchronously) with consumers. These advantages may include temporal decoupling, load leveling, load balancing and loose coupling. Temporal decoupling refers to the fact that publishers and consumers need not be online at the same time to facilitate the reliable delivery of messages there between. Thus, components can be disconnected either voluntarily (e.g., for maintenance or due to a component crash without impacting the system as a whole. Furthermore, a consumer may only need to come online during certain times of the day. Load leveling refers to the fact that, because the queue acts as an intermediary between a publisher and a consumer, the consumer need only be provisioned to accommodate the average system load rather than the peak system load. Load balancing refers to the fact that, as load increases, more consumers can be added to read messages from the queue. Each message is processed by only one of the consumers. Furthermore, the use of pull-based load balancing allows for optimum utilization of the consumers even if the consumers differ in terms of processing power as they will pull messages at their own maximum rate. Loose coupling refers to the fact that, since publishers and consumers are not aware of each other, a consumer can be upgraded without having any effect on the publisher. Additionally, the messaging topology can evolve without impacting the existing endpoints.

In one implementation, messages may be received from queue 208 in two different modes, one of which may be referred to as "receive and delete" and one of which may be referred to as "peek lock." In accordance with the "receive and delete" mode of operation, receiving is a single-shot operation. That is, when the message broker that manages queue 208 receives a request for a message contained in queue 208, it marks the message as being consumed and returns it to the requesting application, "Receive and delete" mode works best for scenarios in which the requesting application can tolerate missing messages.

In "peek lock" mode, receive becomes a two stage operation which makes it possible to support applications that cannot tolerate missing messages. In accordance with this mode, when the message broker that manages queue 208 receives a request for a message contained in queue 208, it finds the next message to be consumed, locks it to prevent other consumers from receiving it, and then returns it to the requesting application. After the requesting application finishes processing the message (or stores it reliably for future processing), it completes the second stage of the receive process by calling complete on the received message. When the message broker observes the complete, it will mark the message as being consumed. If the application calls abandon on the received message instead of complete, or if the application fails to process the message before the lock expires, then the message broker will unlock the message and make it available to be received again.

Figure 3:
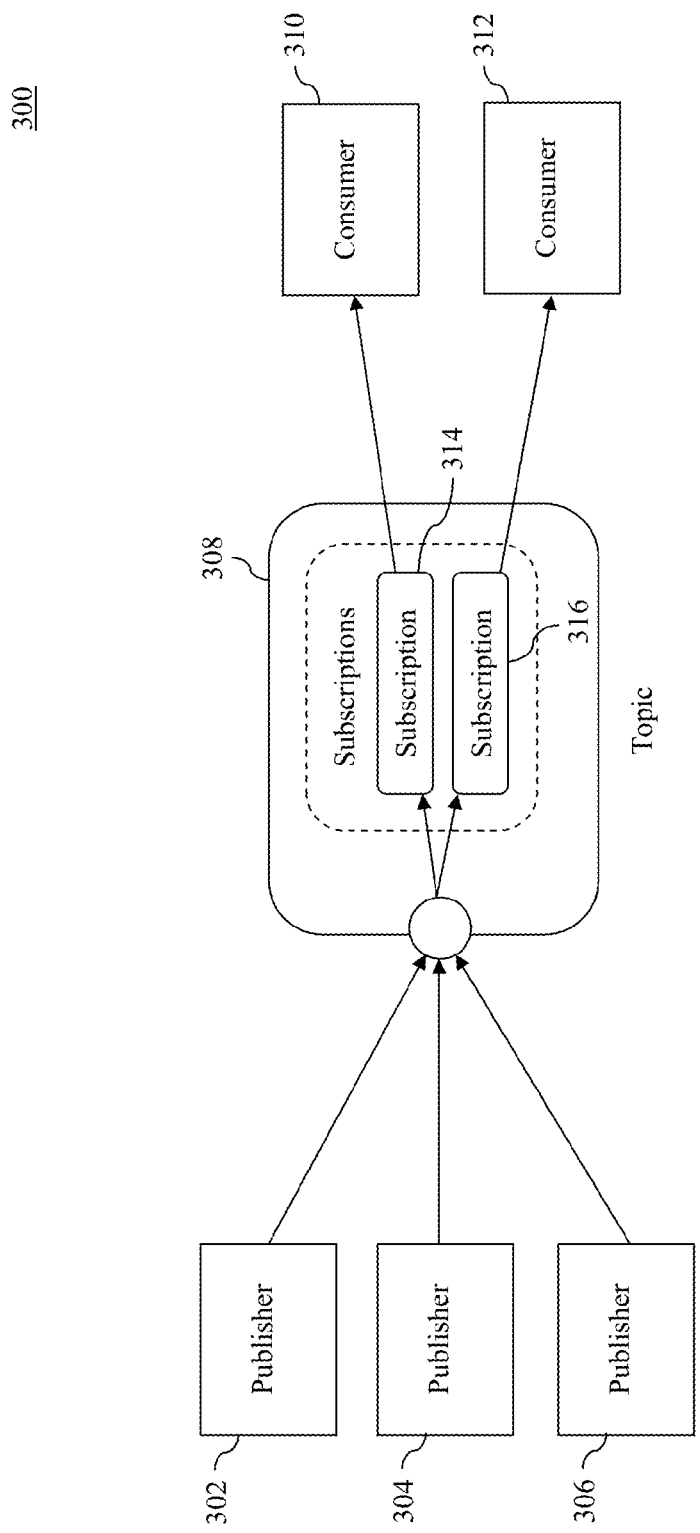
FIG. 3 is a block diagram that illustrates a topic-based messaging pattern that may be supported by a distributed messaging system.

A topic-based messaging pattern will now be described in reference to block diagram 300 of FIG. 3. This pattern is also sometimes referred to as a "publish/subscribe" or "pub/sub" pattern. In accordance with this pattern, each of a plurality of publishers 303, 304 and 306 is capable of publishing messages which are enqueued in a topic 308. Topic 308 is managed by a message broker (such as any of message brokers $114_1$-$114_N$ as shown in FIG. 1) and the messages that are contained therein are stored in a storage system or device that is accessible to the message broker. Multiple consumers can have a registered interest, referred to as a subscription, in receiving messages that are published to topic 308. Thus, as shown in FIG. 3, a consumer 310 can have a corresponding subscription 314 for receiving messages that were published to topic 308 and a consumer 312 can have a corresponding subscription 316 for receiving messages that were published to topic 308. Such consumers can also optionally register rules or filters that can be applied to selectively determine which messages published to topic 308 the consumer is interested in. Every message that is published to topic 308 is delivered to all the matching subscriptions.

As can be seen from the foregoing, topics support a publish/subscribe pattern in which each published message is made available to each subscription registered with the topic. This is in contrast with the queue pattern, in which each message is consumed by a single consumer. Messages may be sent to a topic in the same way as they are sent to a queue but messages are not received from the topic directly, instead they are received from subscriptions. A topic subscription may be thought of as a virtual queue that obtains copies of the messages that are sent to the topic. Messages may be received from a subscription in the same manner in which they may be received from a queue. Thus, for example, "receive and delete" and "peek lock" modes may be used to receive messages from a subscription. As also noted above, subscription filters may be used to copy only a subset of the available messages in a topic to a virtual subscription queue.

Both the queue-based and topic-based messaging patterns described above may support the concept of "message sessions." A message session is a set of messages that are related to each other. Each message in a message session may include an identical session identifier (ID) that uniquely identifies the message session and that can be used to determine which messages belong thereto. In one implementation of distributed messaging system 100, only one instance of a consumer is allowed to receive messages from any given message session contained within a messaging entity (e.g., a queue or subscription) at a time. When one instance of a consumer is receiving messages from the message session, the message session is considered to be "locked," If no consumer instance is receiving from that message session (which can be determined based on idle time or if a consumer explicitly releasing the message session), then the message session is considered to be "unlocked." A message session can also have a piece of state associated with it. In a further implementation, messages within a message session are always ordered.

Returning now to the description of distributed messaging system 100 of FIG. 1, each message broker $114_1$-$114_N$ manages a corresponding set of messaging entities $116_1$-$116_N$. A messaging entity may comprise, for example and without limitation, a queue, topic or subscription as described above in reference to FIGS. 2 and 3. As will be appreciated by persons skilled in the relevant art(s), a messaging entity may also comprise a variety of other logical and/or physical structures for managing the receipt, storage and delivery of messages. In one implementation, users of distributed messaging system 100 are capable of creating a messaging entity and of creating publishers that can publish messages to the messaging entity and consumers that can consume messages from the messaging entity.

In order to interact with a messaging entity, a publisher or consumer must send requests to a gateway, such as gateway 112. Gateway 112 is intended to represent a machine or process that facilitates access by publishers or consumers to the messaging entities within messaging service 102. Gateway 112 operates, at least in part, to receive requests for a particular messaging entity from a publisher or consumer and to deliver such requests to the appropriate message broker residing on the appropriate messaging host. Gateway 112 also delivers responses from the particular messaging entity back to the appropriate publisher or consumer. Gateway 112 thus relieves publishers and consumers from having to know which machines or processes are hosting or managing a messaging entity with which interaction is sought. Gateway 112 may sometimes be referred to as a "front end" of messaging service 102, while messaging hosts $110_1$-$110_N$ may be referred to as being part of a "back end" of messaging service 102. Although only a single gateway 112 is shown in FIG. 1, it is to be understood that messaging service 102 can include any number of gateways, each of which may interact with a variety of different messaging hosts, publishers and consumers.

In one embodiment, distributed messaging system 100 comprises a publicly-hosted distributed messaging system in which clients connect to messaging service 102 using publicly-accessible networks, such as the Internet. However, this is only an example, and a variety of different networks or other communication links may be used to facilitate connections between clients and messaging service 102. Within messaging service 102, any of a wide variety of suitable communication links can be used to connect gateway 112 to each of messaging hosts $110_1$-$110_N$. Such suitable communication links will be readily known to persons skilled in the relevant art(s).

In the context of the operating environment shown in FIG. 1, it is possible that a user may wish to receive a message from a messaging entity within messaging service 102. In one possible implementation, the user must perform (or cause to be performed) the following steps to achieve this: (1) a connection is established to messaging service 102; (2) a receive request is passed from a consumer via gateway 112 to the messaging host that owns the particular messaging entity and lodged there; and (3) when the particular messaging entity receives a message, a response is sent from the messaging host that owns that messaging entity via gateway 112 back to the consumer. In accordance with such an implementation, if a user wishes to listen for messages across a small number of messaging entities (e.g., in the order of 100s), then it is possible that the above steps can be performed for each messaging entity without significantly impairing performance. However, if a user wishes to listen for messages across a large number of messaging entities (e.g., millions of them), then the above approach simply does not scale. For example, in certain implementations, sending one million receive requests alone could take on the order of hours, which would likely be considered unacceptable. Furthermore, if the messaging entities are sparsely populated with data, then a large amount of network traffic is generated by the user for retrieving a comparatively negligible amount of data.

As will be explained in the following section, embodiments described herein provide an efficient distributed system that enables a user to listen for messages across a large number of messaging entities. The embodiments described herein are designed to ensure that a minimal amount of traffic is generated by the user in order to receive a message, and if a message is published to one of the many messaging entities that the user is listening to, then the user receives the message with very low latency. Additionally, in accordance with embodiments described in the following section, a user need only issue a single receive request, and it will be immediately satisfied when a message is published into a messaging entity.

III. Systems and Methods for Receiving Messages Across a Large Number of Messaging Entities Systems and methods for receiving messages across a large number of messaging entities will now be described. The systems and methods will be described within the context of the example operating environment of system 100 of FIG. 1, although it is to be understood that the systems and methods are not limited to that operating environment.

In this section, embodiments will first be described that enable users to receive messages from message sessions across a large number of messaging entities. As noted above, a message session comprises a set of related messages. However, as will be explained below, the systems and methods described herein may be generalized to encompass the receipt of individual messages (as opposed to message sessions) from across a large number of messaging entities.

A. Receiving Messages from Message Sessions Across a Large Number of Messaging Entities In an embodiment, logic necessary to implement a system and method for receiving messages from message sessions across a large number of messaging entities exists in at least messaging hosts $110_1$-$110_N$ and gateway 112. In accordance with such an embodiment, each messaging host $110_1$-$110_N$ is configured to keep track of all available message sessions for all of the messaging entities that it hosts. In further accordance with such an embodiment, gateway 112 is configured to interact with all messaging hosts $110_1$-$110_N$ in distributed messaging system 100 and to forward requests and responses for message sessions between a client and a message broker.

The operations of messaging hosts $110_1$-$110_N$ in accordance with such an embodiment will now be further described. Each messaging host $110_1$-$110_N$ is configured to track the number of available message sessions for each of the messaging entities that it hosts. By so doing, a messaging host is able to determine when a message session is available to be accessed by a consumer. An available message session may comprise, for example, an unlocked message session. As previously noted, a message session may be locked during a time period in which messages therefrom are being consumed by a consumer. Locking the message session may be carried out, for example, in order to prevent two instances of the same consumer from retrieving messages from the same message session at the same time.

Figure 4:
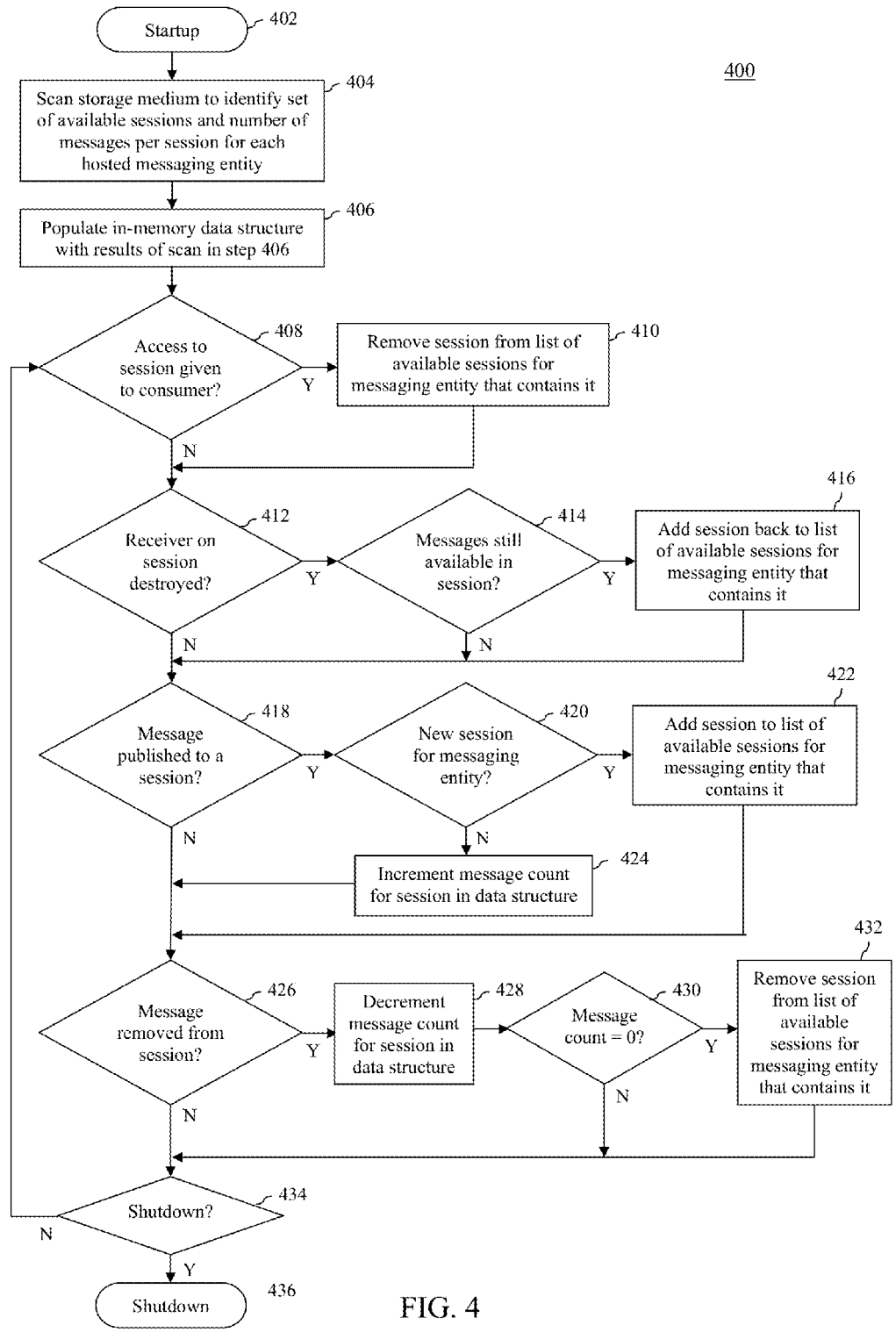
FIG. 4 depicts a flowchart of an example method by which a messaging host in a distributed messaging system may keep track of available message sessions for each of a plurality of messaging entities in accordance with an embodiment.

FIG. 4 depicts a flowchart 400 of an example method by which a messaging host in a distributed messaging system may keep track of available message sessions for each messaging entity that it hosts. It is noted that the method of flowchart 400 is described herein by way of example only and is not intended to be limiting. Persons skilled in the relevant art(s) will appreciate that a variety of different methods may be used by a messaging host to keep track of available message sessions for each messaging entity that it hosts.

As shown in FIG. 4, the method of flowchart 400 begins at step 402 in which a messaging host starts up. After startup, the messaging host scans its associated storage medium to identify the set of available message sessions for each messaging entity that it hosts and to determine the number of messages in each such available message session as shown at step 404. During step 406, the messaging host populates an in-memory data structure, such as a table, with the information obtained during step 404.

After step 406, the messaging host monitors to determine if any of a number of events has occurred that will require the information included in the in-memory data structure to be modified, as represented by decision steps 408, 412, 418 and 426. If any of these events occur, then the messaging host will perform an appropriate action or series of actions as will be described below. The messaging host will perform the aforementioned monitoring function until such time as it is shut down. Thus, as shown in decision step 434, if it is determined that the messaging host is to be shut down, then control flows to step 436, during which the messaging host is shut down and the method of flowchart 400 ends. Otherwise, control returns to decision step 408, and the monitoring continues.

As shown at decision step 408, the messaging host monitors to determine if access to a message session contained within a messaging entity has been given to a consumer. If such access has been given, then the message session will be locked as described above and the messaging host will modify the in-memory data structure to remove the message session from the list of available sessions for the messaging entity that contains it as shown at step 410. If such access has not been given, then the messaging host will not modify the in-memory data structure.

As shown at decision step 412, the messaging host also monitors to determine if a receiver on a message session is destroyed (i.e., a consumer is no longer capable of accessing messages from a message session). If this occurs, then the messaging host will determine if there are still messages that are available in the message session as shown at decision step 414. If there are still messages available in the message session, then the messaging host will add the message session back to the in-memory data structure as part of the list of available message sessions for the messaging entity that contains it as shown in step 416. If there are no more messages available in the message session, then the messaging host will not update the in-memory data structure.

As shown at decision step 418, the messaging host further monitors to determine if a message has been published to a message session. If this occurs, then the messaging host will determine if the message has been published to a new message session or an existing message session as shown at decision step 420. If the message has been published to a new message session, then the messaging host will update the in-memory data structure to add the message session to the list of available message sessions for the messaging entity that contains it as shown at step 422. However, if the new message has been published to an existing message session, then the messaging host will update the in-memory data structure to increase the message count for the existing message session. If no messages have been published to a message session, then the messaging host will not update the in-memory data structure.

As shown at decision step 426, the messaging host additionally monitors to determine if a message has been removed from an existing message session that is stored in the in-memory data structure. Such removal may occur, for example, due to the message being consumed, moved or destroyed. If a message has been removed from an existing message session that is stored in the in-memory data structure, then the messaging host decrements by one the message count for the existing message session that is stored in the in-memory data structure as shown at step 428. Then, the messaging host determines if the message count for the existing message session that is stored in the in-memory data structure has been reduced to zero as shown at decision step 430. If the message count for the existing message session that is stored in the in-memory data structure has been reduced to zero, then the in-memory data structure is updated to remove the message session from the list of available message sessions for the messaging entity that contains it as shown at step 432. If no messages have been removed from an existing message session, then the messaging host will not update the in-memory data structure at all.

In addition to keeping track of available message sessions for each messaging entity that it hosts, each messaging host also maintains an ordered list of all messaging entities hosted thereby that currently have at least one available message session. The list is ordered based on when each messaging entity included in the list last provided a consumer with access to a message session. In particular, the list is ordered such that the messaging entity that has not provided access to a message session in the longest time is at the beginning of the list and the messaging entity that most recently provided access to a message session is at the end of the list. Such an approach is intended to provide fairness in servicing all of the messaging entities hosted by a messaging host.

In one embodiment, each messaging host utilizes a first-in-first-out (FIFO) data structure to implement the ordered list. In accordance with such an embodiment, the messaging host provides a consumer with access to a message session contained in the messaging entity at the head of the FIFO data structure and then removes the messaging entity from the head of the FIFO data structure. If the messaging entity still has more available message sessions, then the messaging host will re-insert the messaging entity at the tail of the FIFO data structure.

In one embodiment, the ordered list is maintained in volatile memory and is therefore lost if the messaging host resets. In accordance with such an embodiment, the ordered list must be reconstructed each time the messaging host is started up. In an alternate embodiment, the ordered list is maintained in non-volatile memory such that the list may be maintained even when the messaging host is shut down.

Figure 5:
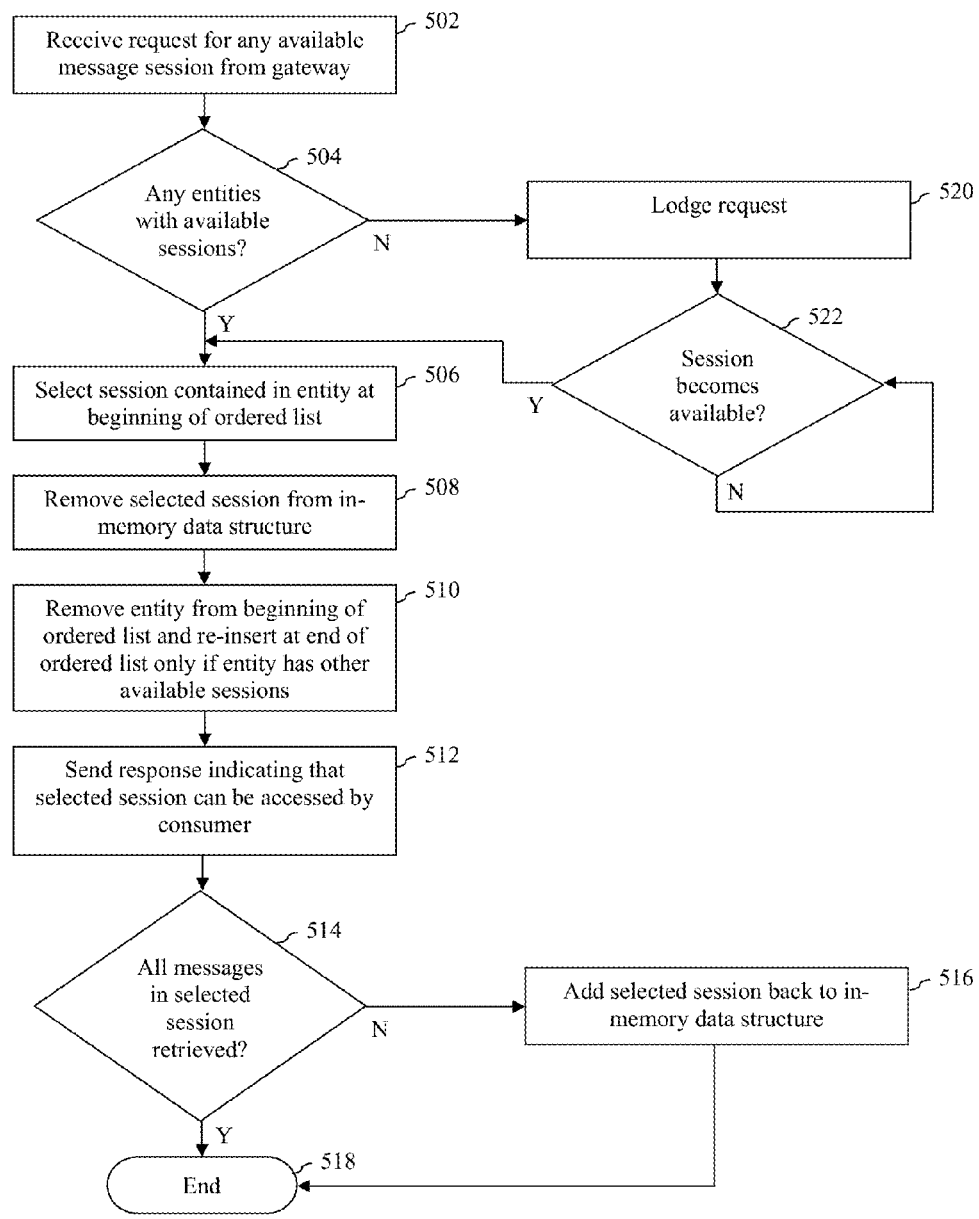
FIG. 5 depicts a flowchart of a method by which a messaging host in a distributed messaging system may determine how to service a request for any available message sessions received from a gateway in accordance with an embodiment.

Using the in-memory data structure and the ordered list described above, each messaging host can then determine how to service a request for any available message sessions that may be sent by a gateway, such as gateway 112, on behalf of a consumer. FIG. 5 depicts a flowchart 500 of the algorithm that may be used by each messaging host in performing this function. It is noted that the method of flowchart 500 is described herein by way of example only and is not intended to be limiting. Persons skilled in the relevant art(s) will appreciate that a variety of different methods may be used by a messaging host to determine how to service a request for any available message sessions that is sent by a gateway on behalf of a consumer.

As shown in FIG. 5, the method of flowchart 500 begins at step 502 in which a messaging host receives a request for any available message session from a gateway, such as gateway 112. As will be discussed below in reference to FIG. 6, the gateway may send such a request to the messaging host on behalf of a consumer that is seeking to receive any available message session from across all messaging entities in messaging service 102.

In response to receiving the request, the messaging host determines whether any of the messaging entities that it hosts have an available message session as shown at decision step 504. The messaging host performs this function by consulting an in-memory data structure that identifies the available message sessions for each messaging entity that it hosts. Such in-memory data structure may be maintained in accordance with the method of flowchart 400 as described above in reference to FIG. 4, although this is only an example.

If, during decision step 504, the messaging host determines that there is at least one messaging entity that has an available message session, then control flows to step 506, during which the messaging host selects a message session contained by the messaging entity that appears at the beginning of the ordered list of messaging entities having available message sessions, the ordering and maintenance of which was previously described. In one embodiment, the messaging host performs this step by selecting a message session contained by the messaging entity that appears at the head of a FIFO data structure.

During step 508, the messaging host removes the message session that was selected, during step 506 from the in-memory data structure that identifies the available message sessions for each messaging entity that it hosts.

During step 510, the messaging host removes the messaging entity that contains the selected message session from the beginning of the ordered list of messaging entities having available message sessions. If the messaging entity that contains the selected message session has other available message sessions, then the messaging host re-inserts the messaging entity at the end of the ordered list. Otherwise, the messaging entity simply removes the messaging entity from the ordered list. In an embodiment, removing the messaging entity from the ordered list comprises removing the messaging entity from the head of a FIFO data structure and re-inserting the messaging entity at the end of the ordered list comprises re-inserting the messaging entity into the tail of the FIFO data structure.

During step 512, the messaging host sends a response to the gateway indicating that the message session selected during step 506 can be accessed by the consumer that caused the request received during step 502 to be issued. The sending of such a response may be referred to as "returning the message session to the gateway." In one embodiment, sending the response comprises sending at least an identifier of the selected message session to the gateway. In a further embodiment, sending the response comprises sending a first message in the selected message session as well as the state of the selected message session. Such an approach may serve to reduce a number of roundtrips need by a consumer to process the messages in the selected message session.

During decision step 514, after the period during which the messages in the selected message session may be accessed ends (e.g., due to expiration of a lock on the selected message session or for some other reason), the messaging host determines whether all the messages in the selected message session have been retrieved by the consumer. If there are messages that have still not been retrieved, then the messaging host will add the selected message session back to the in-memory data structure as an available message session as shown at step 516, after which the method of flowchart 500 ends as shown at step 518. However, if all the messages in the selected message session were retrieved during the access period then the method of flowchart 500 simply ends as shown at step 518.

Returning now to decision step 504, if the messaging host receives a request for any available message session from a gateway and determines that there are currently no messaging entities that contain any available message sessions, then the messaging host will lodge (or "park") the request as shown at step 520. The messaging host will hold the request until such time as a message session contained in any of the messaging entities that it hosts becomes available, as denoted by decision step 522. When a message session becomes available, then the messaging host will service the lodged request in the manner described above beginning with step 506.

The manner in which a gateway, such as gateway 112, may operate to enable a consumer to receive messages from message sessions across a large number of messaging entities will now be described.

In accordance with an embodiment, when a consumer requests any available message session, messaging service 102 can hand out an available message session from any messaging host included in messaging service 102. To support this feature, when the gateway receives a request for any available message session from a consumer, the gateway sends a corresponding request to every messaging host in messaging service 102 for any available message session from each. The gateway may then receive a large number of responses back from a large number of messaging hosts, the responses identifying an available session that can be accessed by the consumer. The gateway returns a selected one of the responses back to the consumer and stores the remaining responses in a cache. When the consumer sends a request for another message session, the gateway will try to service the request from the cache. If the gateway cannot service the request from the cache, then the gateway will send a new batch of requests to the messaging hosts and the process will continue in the manner set forth above.

Figure 6:
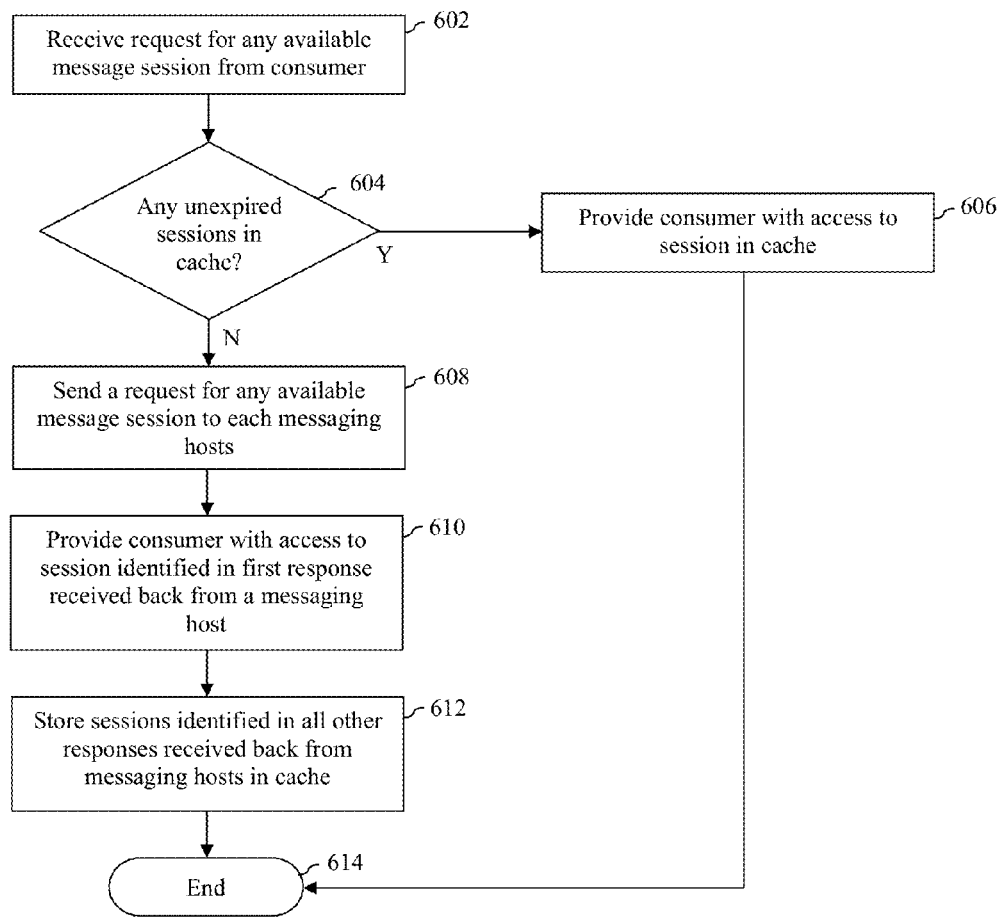
FIG. 6 depicts a flowchart of a method by which a gateway in a distributed messaging system may operate to enable a consumer to receive messages from message sessions across a large number of messaging entities in accordance with an embodiment.

FIG. 6 depicts a flowchart 600 of one example method by which a gateway in a distributed messaging system, such as gateway 112, may operate to enable a consumer to receive messages from message sessions across a large number of messaging entities in accordance with an embodiment. It is noted that the method of flowchart 600 is described herein by way of example only and is not intended to be limiting. Persons skilled in the relevant art(s) will appreciate that a variety of different methods may be used by a gateway to enable a consumer to receive messages from message sessions across a large number of messaging entities.

As shown in FIG. 6, the method of flowchart 600 begins at step 602, in which the gateway receives a request for any available message session from a consumer, such as consumer 106.

In response to receiving the request, the gateway determines whether there is an available message session identified in an entry in local cache, wherein the entry has not expired. This is shown at decision step 604. In one embodiment, each entry in the cache comprises at least an identifier of an available message session. In a further embodiment, each entry in the cache includes a first message in an available message session and a state associated with the available message session. In a still further embodiment, an entry in the cache is expired when a lock on the message session identified by the entry expires, the lock being placed on the identified message session by a messaging host that hosts the messaging entity that contains the identified message session.

If the gateway determines during decision step 604 that there is an available message session identified in an unexpired cache entry, then the gateway will provide the consumer with access to the available message session identified in the unexpired cache entry as shown at step 606, after which the method of flowchart 600 ends as shown at step 614. In one embodiment, providing the consumer with access to the available message session identified in the unexpired cache entry comprises sending the consumer a response that includes at least a portion of the information included in the relevant cache entry, although this is only an example.

If the gateway determines during decision step 606 that there is no available message session identified in an unexpired cache entry, then the gateway will send a request for any available message session to each of the messaging hosts in the messaging service as shown at step 608. These requests may be handled be each messaging host in the manner described above in reference to flowchart 500 of FIG. 5 although this is only an example.

In response to sending these requests, one or more of the messaging hosts may send a response to the gateway identifying an available message session contained within a messaging entity managed by the messaging host that can be accessed by the consumer. During step 610, the gateway provides the consumer with access to the available message session identified in the first response that is received back from a messaging host. In one embodiment, providing the consumer with access to the available message session may comprise sending a response to the consumer that includes at least an identifier of the available message session. In a further embodiment, providing the consumer with access to the available message session may comprise sending a response to the consumer that includes the first message in the available message session and the state of the available message session. After receiving such response, the consumer may then initiate a series of interactions with the messaging service by which the remainder of the messages in the message session are retrieved from the appropriate messaging host.

During step 612, the gateway stores any sessions identified in all other responses received back from the messaging hosts in the local cache. These responses may then be used to service future requests for any available message session received from the consumer in the manner described above in reference to step 606. As also discussed above in reference to step 606, a response stored in the local cache may be expired and then removed therefrom when a lock on the message session identified by the response expires. Additionally, in one embodiment, if the consumer's connection with the gateway is terminated, then the gateway automatically purges the local cache. After step 612 is performed, the method of flowchart 601) ends as shown at step 614.

From the perspective of the consumer, a single request for any available message session is sent to a gateway in a messaging service. The gateway then internally broadcasts requests for any available message session to all the messaging hosts within the messaging service, aggregates/caches the responses from the messaging hosts, and then ultimately sends a response back to the consumer. Thus, while there may be a considerable amount of network traffic within the messaging service, the amount of traffic between the consumer and the messaging service remains constant, regardless of whether the messaging service has millions of messaging entities or just a handful.

The foregoing methods described embodiments in which a consumer request for any available message session can be serviced by every messaging entity in a messaging service, such as messaging service 102. However, it is noted that the concepts represented by the foregoing methods may also be applied to support consumer requests for any available message session or message contained in a particular subset of the messaging entities in the messaging service. For example, in one embodiment, when a consumer, such as consumer 106, issues a request for any available message session or message to gateway 112, the consumer can specify some criteria that can be used by gateway 112 to choose the set of messaging entities from which the consumer should receive message sessions or messages. For example, the consumer can specify that it wants to receive message sessions or messages from all messaging entities having a name that starts with a certain set of characters (e.g., "Foo"). When gateway 112 receives such a request, it can determine which of the plurality of messaging hosts 110$_1$-110$_N$ host messaging entities that satisfy the specified criteria and then forward the request only to those messaging hosts. For example, in one embodiment, gateway 112 may perform this function by accessing a routing database that enables it to identify messaging entities that satisfy the specified criteria and the messaging hosts that host them. When a request that is forwarded by gateway 112 is received by a messaging host, the messaging host will determine whether it has an available message session or message for servicing the request by evaluating the specified criteria and also in accordance with the methods previously described herein.

B. Generalized Approach to Receiving Messages or Sets of Related Messages from Across a Large Number of Messaging Entities Embodiments were described above that enable users to receive messages from message sessions across a large number of messaging entities in a distributed messaging system. However, as will be appreciated by persons skilled in the relevant art(s), the systems and methods described herein may be generalized, to encompass the receipt of individual messages (as opposed to message sessions) from across a large number of messaging entities. Generally speaking, this may be achieved by configuring each messaging host to keep track of all available messages for all of the messaging entities that it hosts and by configuring a gateway to interact with all the messaging hosts in the distributed messaging system and to forward requests and responses for messages between a client and a message broker.

Figures 7, 8:
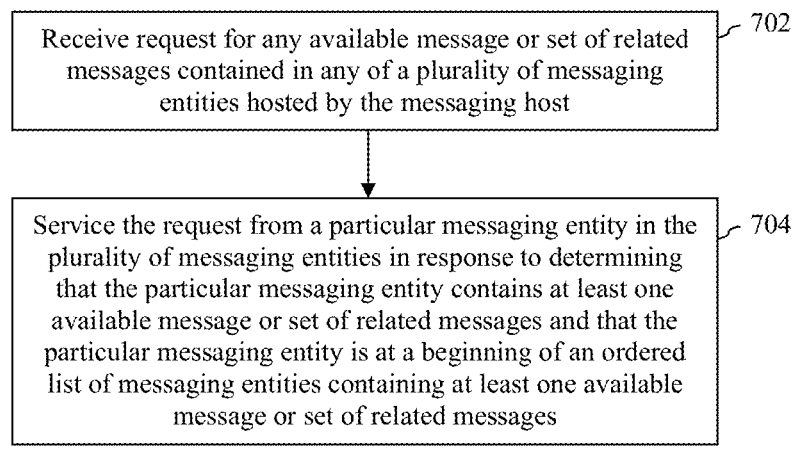
FIG. 7 depicts a flowchart of a generalized, method by which a messaging host in a distributed messaging system may service a request for any available message or set of messages contained in any of a plurality of messaging entities hosted by the messaging host in accordance with an embodiment.
FIG. 8 depicts a flowchart of a further method by which a messaging host in a distributed messaging system may service a request for any available message or set of related messages contained in any of a plurality of messaging entities hosted by the messaging host in accordance with an embodiment.

To further illustrate this point, FIG. 7 depicts a flowchart 700 of a generalized method by which a messaging host in a distributed messaging system may service a request for any available message or set of related messages contained in any of a plurality of messaging entities hosted by the messaging host in accordance with an embodiment. The method of flowchart 700 may be performed, for example, by any of messaging hosts 110$_1$-110$_N$ depicted in FIG. 1. However, the method is not limited to that implementation.

As shown in FIG. 7, the method of flowchart 700 begins at step 702 in which the messaging host receives a request for any available message or set of related messages contained in any of a plurality of messaging entities hosted by the messaging host. Such request may be received, for example, from a gateway such as gateway 112. In one embodiment, receiving the request comprises receiving a request for any available message or set of related messages contained in any of a plurality of queues or subscriptions hosted by the messaging host.

At step 704, the messaging host services the request from a particular messaging entity in the plurality of messaging entities in response to determining that the particular messaging entity contains at least one available message or set of related messages and that the particular messaging entity is at a beginning of an ordered list of messaging entities containing at least one available message or set of related messages.

In one embodiment, determining that the particular messaging entity is at the beginning of the ordered list of messaging entities containing at least one available message or set of related messages comprises determining that the particular messaging entity is at the head of a FIFO data structure.

In a further embodiment, the method of flowchart 700 may further comprise moving the particular messaging entity to the end of the ordered list of messaging entities in response to determining that the particular messaging entity still contains at least one available message or set of related messages after the request has been service.

In a still further embodiment, the method of flowchart 700 may further comprise maintaining a data structure that identifies each of the plurality of messaging entities that contains at least one available message or set of related messages and that identifies the available message(s) or set(s) of related messages for each identified messaging entity. In accordance with such an embodiment, determining that the particular messaging entity contains at least one available message or set of related messages may include determining that the particular messaging entity is identified in the data structure.

In further accordance with such an embodiment, servicing the request during step 704 may comprise locking a particular message or set of related messages contained by the particular messaging entity, sending a response that indicates that the particular message or set of related messages can be accessed by a client that caused the request to be issued, and removing the particular message or set of related messages from the data structure. In still further accordance with such an embodiment, the method of flowchart 700 may further comprise adding the particular message or set of related messages back to the data structure in response to determining that the particular message or set of related messages is still available after the request has been serviced.

FIG. 8 depicts a flowchart 800 of a further method by which a messaging host in a distributed messaging system may service a request for any available message or set of related messages contained in any of a plurality of messaging entities hosted by the messaging host in accordance with an embodiment. Like the method of flowchart 700, the method of flowchart 800 may be performed by any of messaging hosts 110$_1$-110$_N$ depicted in FIG. 1. However, the method is not limited to that implementation.

As shown in FIG. 8, the method of flowchart 800 begins at step 802, in which the messaging host receives a second request for any available message or set of related messages contained in any of the plurality of messaging entities hosted by the messaging host. Such request may be received, for example, from a gateway such as gateway 112. In one embodiment, receiving the request comprises receiving a request for any available message or set of related messages contained in any of a plurality of queues or subscriptions hosted by the messaging host.

At step 804, the messaging host lodges (or "parks") the second request in response to determining that there are no messaging entities among the plurality of messaging entities that contains at least one available message or set of related messages.

In one embodiment, the method of flowchart 800 may further comprise maintaining a data structure that identifies each of the plurality of messaging entities hosted by the messaging host that contains at least one available message or set of related messages and that identifies the available message(s) or set(s) of related messages for each identified messaging entity. In accordance with such an embodiment, determining that there are no messaging entities among the plurality of messaging entities in step 804 may include determining that none of the messaging entities hosted by the messaging host is identified in the data structure.

The method of flowchart 800 may further comprise servicing the lodged request when the messaging host determines that a message or set of messages contained in one of the hosted messaging entities has become available.

Figure 9:
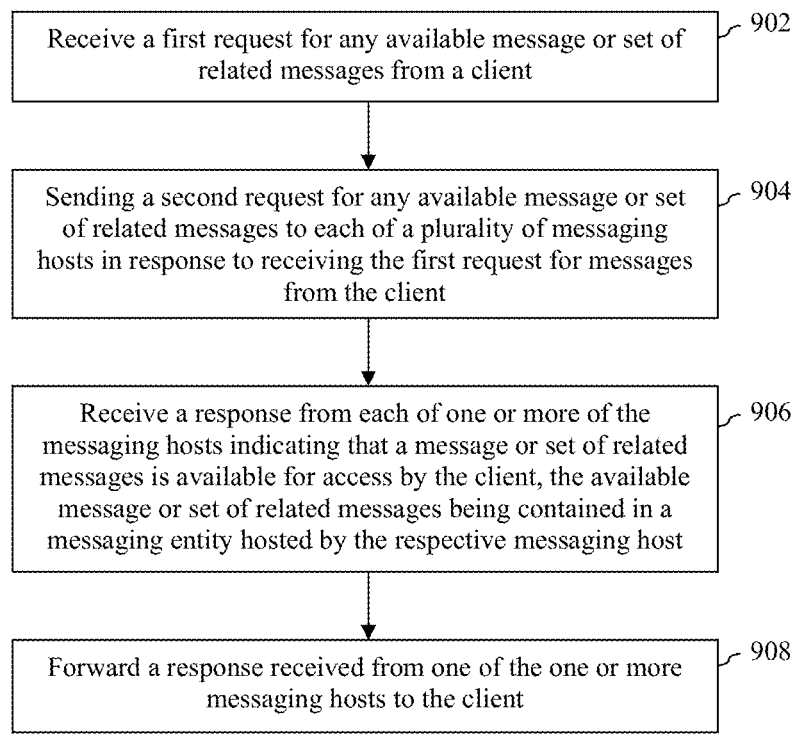
FIG. 9 depicts a flowchart of a generalized method by which a gateway in a distributed messaging system may facilitate the servicing of a request for any available message or set of related messages contained in any of a plurality of messaging entities in accordance with an embodiment.

FIG. 9 depicts a flowchart 900 of a generalized method by which a gateway in a distributed messaging system may facilitate the servicing of a request for any available message or set of related messages contained in any of a plurality of messaging entities in accordance with an embodiment. The method of flowchart 900 may be performed, for example, by gateway 112 as depicted in FIG. 1. However, the method is not limited to that implementation.

As shown in FIG. 9, the method of flowchart 900 begins at step 902 in which the gateway receives a first request for any available message or set of related messages from a client (e.g., consumer 106).

At step 904, the gateway sends a second request for any available message or set of related messages to each of a plurality of messaging hosts in response to receiving the first request for messages from the client. In one embodiment, the gateway only performs this step if it cannot service the first request from a local cache.

At step 906, the gateway receives a response from each of one or more of the messaging hosts indicating that a message or set of related messages is available for access by the client, the available message or set of related messages being contained in a messaging entity hosted by the respective messaging host.

At step 908, the gateway forwards a response received from one of the one or more messaging hosts during step 908 to the client.

In one embodiment, step 906 comprises receiving a response from each of two or more of the messaging hosts. In accordance with such an embodiment, step 908 may comprise forwarding a first response received from the two or more of the messaging hosts to the client. In further accordance with such an embodiment, the method of flowchart 900 may farther comprise entering all the responses received from the two or more of the messaging hosts other than the first response in a cache managed by the gateway for servicing future requests for any available message or set of related messages from the client.

In further accordance with such an embodiment, the method of flowchart 900 may comprise expiring an entry in the cache when a lock on a message or set of related messages identified by the entry expires, the lock being placed on the message or set of related messages by the messaging host that hosts the messaging entity that contains the identified message or set of related messages.

In still further accordance with such an embodiment, entering a response in the cache may include creating a cache entry that includes at least a first message in a set of related messages identified by the response, a state associated with the set of related messages identified by the response, and an identifier of the messaging entity that contains the set of related messages identified by the response.

IV. Example Processor-Based System Implementation

Figure 10:
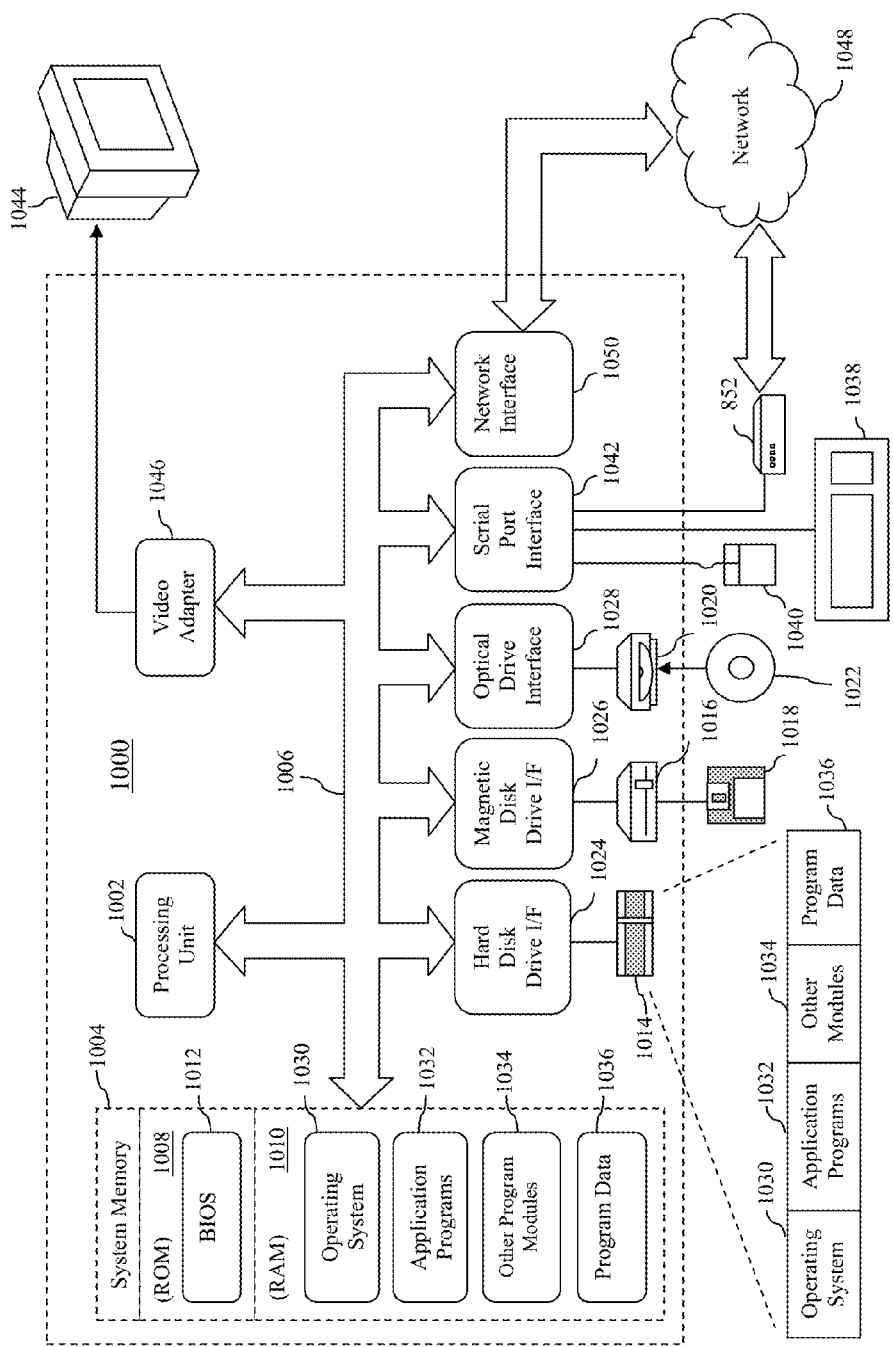
FIG. 10 is a block diagram of an example processor-based system that may be used to implement various embodiments.

FIG. 10 depicts an example processor-based computer system 1000 that may be used to implement various embodiments described herein. For example, system 1000 may be used to implement publisher 104, consumer 106, gateway 112, or any of messaging hosts $110_1$-$110_N$ as described above in reference to FIG. 1, as well as various sub-components thereof. The description of system 1000 provided herein is provided for purposes of illustration, and is not intended to be limiting. Embodiments may be implemented in further types of computer systems, as would be known to persons skilled in the relevant art(s).

As shown in FIG. 10, system 1000 includes a processing unit 1002, a system memory 1004, and a bus 1006 that couples various system components including system memory 1004 to processing unit 1002. Processing unit 1002 may comprise one or more processors or processing cores. Bus 1006 represents one or more of any of several types of bus structures, including a memory bus or memory controller, a peripheral bus, an accelerated graphics port, and a processor or local bus using any of a variety of bus architectures. System memory 1001 includes read only memory (ROM) 1008 and random access memory (RAM) 1010. A basic input/output system 1012 (BIOS) is stored in ROM 1008.

System 1000 also has one or more of the following drives: a hard disk drive 1011 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD RUM, BLU-RAY™ disk or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1030, one or more application programs 1032, other program modules 1034, and program data 1036. In accordance with various embodiments, the program modules may include computer program logic that is executable by processing unit 1002 to perform any or all of the functions and features of publisher 104, consumer 106, gateway 112, or any of messaging hosts $110_1$-$110_N$ as described above in reference to FIG. 1, as well as various sub-components thereof, as described elsewhere herein. The program modules may also include computer program logic that, when executed by processing unit 1002, performs any of the steps or operations shown or described in reference to the flowcharts of FIGS. 4-9.

A user may enter commands and information into system 1000 through input devices such as a keyboard 1038 and a pointing device 1040. Other input devices (not shown) may include a microphone, joystick, game controller, scanner, or the like. In one embodiment, a touch screen is provided in conjunction with a display 1044 to allow a user to provide user input via the application of a touch (as by a finger or stylus for example) to one or more points on the touch screen. These and other input devices are often connected to processing unit 1002 through a serial port interface 1042 that is coupled to bus 1006, but may be connected by other interfaces, such as a parallel port, game port, or a universal serial bus (USB).

A display 1044 is also connected to bus 1006 via an interface, such as a video adapter 1046. In addition to display 1044, system 1000 may include other peripheral output devices (not shown) such as speakers and printers.

System 1000 is connected to a network 1048 (e.g., a local area network or wide area network such as the Internet) through a network interface or adapter 1050, a modem 1052, or other suitable means for establishing communications over the network. Modem 1052, which may be internal or external, is connected to bus 1006 via serial port interface 1042.

As used herein, the terms "computer program medium" and "computer-readable medium" are used to generally refer to non-transitory media such as ROM 1008 and RAM 1010 used to implement system memory 1004, the hard disk associated with hard disk drive 1014, removable magnetic disk 1018, removable optical disk 1022, as well as other media such as flash memory cards, digital video disks, and the like.

As noted above, computer programs and modules (including application programs 1032 and other program modules 1034) may be stored on ROM 1008, RAM 1010, the hard disk associated with hard disk drive 1014, the removable magnetic disk 1018, or the removable optical disk 1022. Such computer programs may also be received via network interface 1050 or serial port interface 1042. Such computer programs, when executed by processing unit 1002, enable system 1000 to implement features of embodiments discussed herein. Accordingly, such computer programs represent controllers of system 1000.

Embodiments are also directed to computer program products comprising software stored on any computer-readable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as ROM, RAM, hard drives, floppy disks, CD ROMs, DVD ROMs, zip disks, tapes, magnetic storage devices, optical storage devices, MEMS-based storage devices, nanotechnology-based storage devices, and the like.

In alternative implementations, each of publisher 104, consumer 106, gateway 112, or any of messaging hosts 110$_1$-110$_N$ as described above in reference to FIG. 1, as well as various sub-components thereof, may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method performed by a messaging host in a distributed messaging system, comprising:
   receiving a request from a gateway for any available message or set of related messages contained in any of a plurality of messaging entities hosted by the messaging host;
   identifying a subset of the plurality of messaging entities that contain at least one available message or set of related messages;
   assembling an ordered list of the messaging entities in the subset of the plurality of messaging entities;
   determining a particular messaging entity in the subset that is at the beginning of the ordered list;
   servicing the request from the particular messaging entity;
   locking a particular message or set of related messages contained by the particular messaging entity until expiration of a time period; and
   sending, to the gateway, a response that indicates that the particular message or set of related messages can be accessed by a client that caused the request to be issued, the response being cached by the gateway and then expired therefrom upon expiration of the same time period.

2. The method of claim 1, wherein receiving the request comprises:
   receiving a request for any available message or set of related messages contained in any of a plurality of queues or subscriptions hosted by the messaging host.

3. The method of claim 1, wherein determining the particular messaging entity in the subset that is at the beginning of the ordered list comprises determining that the particular messaging entity in the subset is at the head of a first-in-first-out (FIFO) data structure.

4. The method of claim 1, further comprising:
   moving the particular messaging entity in the subset to an end of the ordered list in response to determining that the particular messaging entity still contains at least one available message or set of related messages after the request has been serviced.

5. The method of claim 1, further comprising:
   maintaining a data structure that identifies the subset of the plurality of messaging entities that contains at least one available message or set of related messages and that identifies the available message(s) or set(s) of related messages for each identified messaging entity; and
   wherein identifying the subset of the plurality of messaging entities that contains the at least one available message or set of related messages comprises determining that the subset of the plurality of messaging entities is identified in the data structure.

6. The method of claim 5, further comprising:
   removing the particular message or set of related messages from the data structure.

7. The method of claim 6, further comprising:
adding the particular message or set of related messages back to the data structure in response to determining that the particular message or set of related messages is still available after the request has been serviced.

8. A method performed by a gateway in a distributed messaging system, comprising:
receiving a first request for any available message or set of related messages from a client;
sending a second request for any available message or set of related messages to each of a plurality of messaging hosts in response to receiving the first request from the client, each of the plurality of messaging hosts hosting a plurality of messaging entities;
receiving a response from each of one or more of the messaging hosts indicating that a message or set of related messages is available for access by the client, the available message or set of related messages being contained in a messaging entity of the plurality of messaging entities hosted by the respective messaging host;
forwarding a response received from one of the one or more of the messaging hosts to the client; and
storing at least one of the one or more responses received from the one or more of the messaging hosts in an at least one entry of a cache managed by the gateway for servicing future requests for any available message or set of related messages until expiration of a time period, a lock being placed on a message or set of related messages identified by the at least one entry, until expiration of the same time period, by a messaging host that hosts a messaging entity that contains the identified message or set of related messages.

9. The method of claim 8, wherein receiving a response from each of one or more of the messaging hosts comprises receiving a response from each of two or more of the messaging hosts; and
wherein forwarding the response comprises forwarding a first response received from the two or more of the messaging hosts to the client.

10. The method of claim 9, wherein storing at least one of the one or more responses received from the one or more of the messaging hosts in at least one entry of a cache managed by the gateway comprises:
storing all responses received from the two or more of the messaging hosts other than the first response in one or more entries of the cache managed by the gateway.

11. The method of claim 10, wherein storing a response in at least one entry of the cache comprises:
creating the at least one entry that includes at least a first message in a set of related messages identified by the response, a state associated with the set of related messages identified by the response, and an identifier of the messaging entity that contains the set of related messages identified by the response.

12. A distributed messaging system that provides a messaging service, the distributed messaging system comprising:
a client that issues a first request for any available message or set of related messages;
a gateway that receives the first request from the client and, in response thereto, issues a second request for any available message or set of related messages to each of a plurality of messaging hosts; and
the plurality of messaging hosts, each of which hosts a corresponding plurality of messaging entities, each of which services a corresponding one of the second requests from a particular one of the corresponding plurality of messaging entities only in response to determining that the particular messaging entity contains at least one available message or set of related messages and that the particular messaging entity is at a beginning of an ordered list of messaging entities containing at least one available message or set of related messages, the at least one available message or set of related messages in the particular messaging entity being locked by the particular messaging entity until expiration of a time period,
the gateway storing at least one response received from at least one of the plurality of messaging hosts indicating that a message or set of related messages is available for access by the client in a cache managed by the gateway, the at least one response being stored in the cache and then expired therefrom upon expiration of the same time period.

13. The system of claim 12, wherein each messaging entity may comprise one of a queue or a subscription.

14. The system of claim 12, wherein each messaging host determines that the particular messaging entity is at the beginning of the ordered list of messaging entities by determining that the particular messaging entity is at the head of a first-in-first-out (FIFO) data structure.

15. The system of claim 12, wherein each messaging host maintains a corresponding data structure that identifies each of the corresponding plurality of messaging entities that contains at least one available message or set of related messages and that identifies the available message(s) or set(s) of related messages for each identified messaging entity; and
wherein each messaging host determines that the particular messaging entity contains at least one available message or set of related messages by determining that the particular messaging entity is identified in the corresponding data structure.

16. The system of claim 12, wherein each of two or more of the messaging hosts sends a response to the gateway indicating that a message or set of related messages is available for access by the client; and
wherein the gateway forwards a selected one of the responses received from the two or more of the messaging hosts to the client.

17. The system of claim 16, wherein the gateway stores all responses received from the two or more of the messaging hosts other than the selected response in a cache and services a subsequent request by the client for any available message or set of messages from the cache.

18. The system of claim 12, wherein the client provides the gateway with criteria associated with the first request,
wherein the gateway identifies messaging hosts that include messaging entities that satisfy the criteria and issues the second requests to the identified messaging hosts, and
wherein each of the identified messaging hosts services a corresponding one of the second requests from a particular one of a corresponding plurality of messaging entities only in response to determining that the particular messaging entity satisfies the criteria, that the particular messaging entity contains at least one available message or set of related messages, and that the particular messaging entity is at a beginning of an ordered list of messaging entities containing at least one available message or set of related messages.

19. The method of claim 1, further comprising:

removing the particular messaging entity from the ordered list in response to determining that the particular messaging entity does not contain at least one available message or set of related messages after the request has been serviced.

20. The method of claim 1, further comprising:

receiving a second request for any available message or set of related messages contained in any of the plurality of messaging entities managed by the messaging host; and lodging the second request at the messaging host in response to determining that there are no messaging entities among the plurality of messaging entities that contains at least one available message or set of related messages.

* * * * *